United States Patent
Kennedy

Patent Number: 5,386,844
Date of Patent: Feb. 7, 1995

[54] FLOAT ACTUATED COMBINATION AIR AND VACUUM VALVE

[75] Inventor: Paul G. Kennedy, Horseheads, N.Y.

[73] Assignee: Penn Troy Machine Co., Inc., Troy, Pa.

[21] Appl. No.: 807,046

[22] Filed: Dec. 12, 1991

[51] Int. Cl.⁶ ........................ F16K 31/34; F16K 33/00
[52] U.S. Cl. .................................. 137/202; 137/430; 137/444
[58] Field of Search ............... 137/183, 187, 192, 197, 137/199, 202, 429, 430, 433, 442, 443, 444, 445, 613, 614.11, 614.16, 628, 629, 630, 630.14, 630.15; 251/25, 28

[56] References Cited

U.S. PATENT DOCUMENTS

| | | | |
|---|---|---|---|
| 1,119,979 | 12/1914 | Mulligan | 137/202 |
| 1,119,980 | 12/1914 | Mulligan | 137/202 |
| 2,138,903 | 12/1938 | Bradford | 137/445 |
| 2,404,795 | 7/1946 | Garretson | 137/202 |
| 2,673,618 | 10/1952 | Batchelder | 137/202 |
| 3,330,292 | 7/1967 | Lansky | 137/445 |
| 3,334,645 | 9/1965 | Weinstein | 137/202 |
| 3,586,032 | 6/1971 | Weinstein | 137/202 |
| 3,599,659 | 8/1971 | Nuter et al. | 137/445 |
| 3,726,303 | 4/1973 | Allen et al. | 137/202 |
| 3,888,280 | 6/1975 | Tartaglia | 137/630.13 |
| 4,230,142 | 10/1980 | Saarem et al. | 137/445 |
| 4,243,066 | 1/1981 | Lambie | 137/202 |
| 4,586,528 | 5/1986 | Andres et al. | 137/433 |
| 4,696,321 | 9/1987 | Reese et al. | 137/430 |
| 4,730,638 | 3/1988 | Hazelton | 137/202 |
| 4,986,370 | 1/1991 | Kesterman et al. | 137/411 |

OTHER PUBLICATIONS

Valmatic Valve & Mfg. Corp., Operation, Installation and Maintenance Manual, 6 pages.
GA Industries Inc. (Automatic Valve Specialists) "Air Valve Theory & Application", 11 pages.
APCO Valve and Primer Corporation, "Theory & Use of Air Valves" 4 pages.
Multiples Manufacturing Co., "Crispin Air Release Valves" CVB-187, 4 pages.

*Primary Examiner*—George L. Walton
*Attorney, Agent, or Firm*—Ralph R. Barnard

[57] ABSTRACT

A combination air and vacuum valve comprises a valve body (20) including a fluid inlet (25) and gas outlet (26), a valve poppet (8) guided to open and close said outlet (26), a float (19) and rod (18) connected operatively thereto in a vertical orientation for allowing said valve poppet (8) to close and open said gas outlet (26), a seat frame (5) for guiding stem of said poppet (8), a fulcrum pivot lever mechanism to which said float rod (18) is attached and which also contains a valve poppet seat (9) for pushing said valve poppet (8) via its stem to close said outlet (26), a fulcrum pivot axis of said fulcrum pivot lever mechanism containing a torsion spring (11); said spring (11) providing an additional upward force which assists the buoyancy effect of the float (19) in closing the valve. As a result, a smaller float may be used to achieve the same buoyant effect which would normally require a larger float. This allows the dimensions of the valve body to decrease, consequently reducing the weight and overall cost of the valve.

8 Claims, 3 Drawing Sheets

FLOAT ACTUATED COMBINATION AIR AND VACUUM VALVE

FIELD OF THE INVENTION

This invention relates generally to the field of valves and more particularly in controlling liquid and gas flow in a pipeline system with float actuated controls.

BACKGROUND OF INVENTION

Air valves are typically used in pipelines to release gas which may accumulate in the system and constrict pipeline area. Flowing liquid is constantly subjected to velocity and pressure changes, therefore, gasses are continuously coming out of solution. A combination air and vacuum valve performs a dual function within a single valve body. It serves to automatically exhaust large volumes of gas when a pipeline system is being filled with fluid and also allows air to re-enter tile pipeline as it is emptied. Secondly, it releases air which may accumulate in the system when it is in operation and under pressure. Both functions are accomplished through the use of a float mechanism which serves as a weight to open the valve and provides buoyancy to close it.

For various reasons, such as reducing costs, it is often desirable to minimize the size of a valve. Currently, however, the buoyant force necessary to close the valve requires a relatively large float, which places many restrictions on the overall size of the valve.

SUMMARY OF THE INVENTION

It is the object of the present invention to provide a new and improved buoyant effect in a valve float, thereby allowing its size to decrease. Consequently, the entire body of the valve may also be reduced.

In accordance with the foregoing object, a combination air and vacuum valve comprises a valve body including a fluid inlet and gas outlet, a valve poppet guided to open and close said outlet, a float and rod connected operatively thereto in a vertical orientation for allowing said valve poppet to close and open said gas outlet, a seat frame for guiding stem of said poppet, a fulcrum pivot lever mechanism to which said float rod is attached and which also contains a valve poppet seat for pushing said valve poppet via its stem to close said outlet, a fulcrum pivot axis of said fulcrum pivot lever mechanism containing a torsion spring; said spring providing an additional upward force which assists the buoyancy effect of the float in closing the valve. As a result, a smaller float may be used to achieve the same buoyant effect which would normally require a larger float. This allows the dimensions of the valve body to decrease, consequently reducing the weight and overall cost of the valve.

DESCRIPTION OF THE PREFERRED EMBODIMENT

Figure 1:
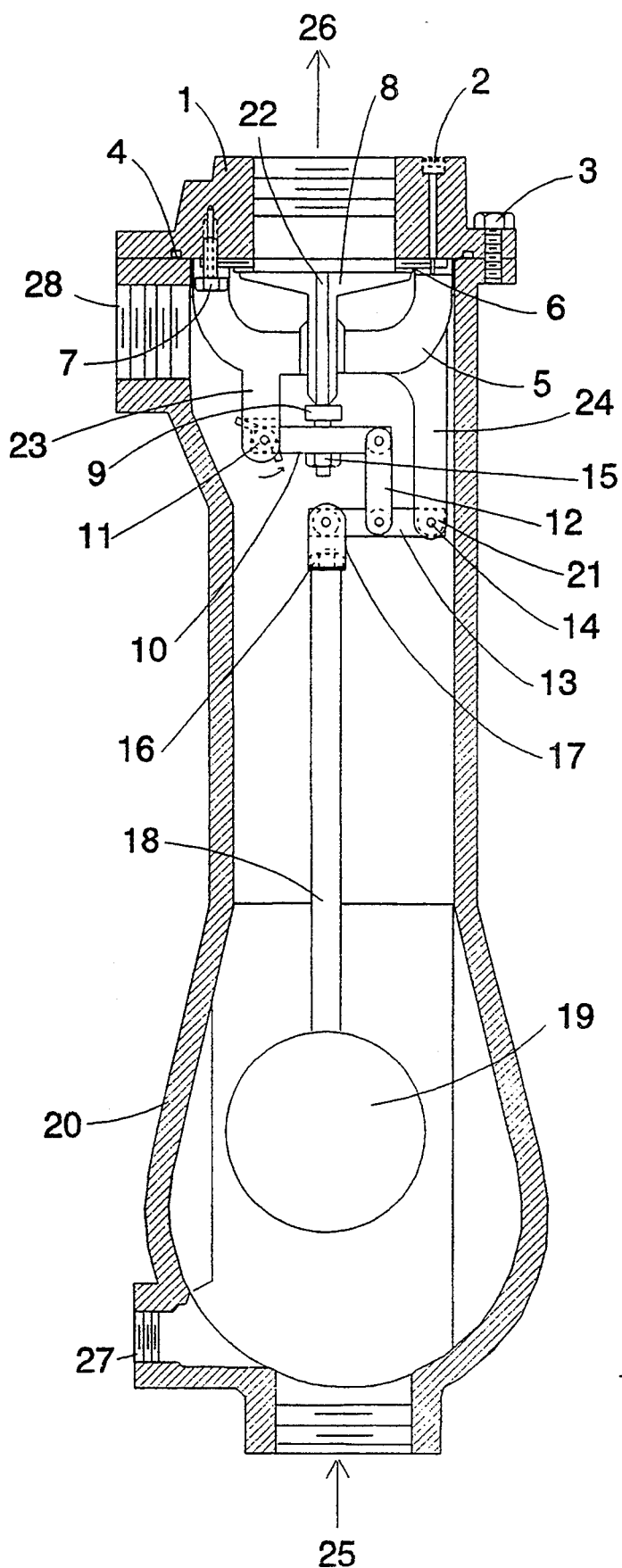
FIG. 1 is a vertical cross section of a sewage combination air and vacuum valve incorporating a double arm mechanism with torsion spring.

The present invention is best described with reference to FIG. 1, which displays the valve with the gas outlet closed.

As shown, the invention comprises a valve body (20) having at each extremity at least one opening. The vertical opening at the bottom of said body (20) being an input (25) including liquid and gas and being continuously open when in use. The vertical opening at the upper part of said body being an outlet (26) for gas when system is not under pressure as measured in the valve. The two horizontal openings at the top (28) and bottom (27) of said body (20) are cleaning ports through which fluid may be passed to clean the inside of said valve. A bleed pipe plug (2) is used to adjust the initial pressure within the valve prior to operation.

A valve poppet (8) is used to cover said gas outlet (26) by rising perpendicularly to and fitting against an air and vacuum seat (6) when the valve is in operation and under pressure. This is the position shown in FIG. 1. Said valve poppet (8) will also move vertically downward away from the air and vacuum seat (6) to open said gas outlet (26) for the release of large volumes of gas. This will occur in such cases as when the pipeline system is initially filled and/or not under gas pressure.

A gas outlet aperture (22) is present within the center of said poppet (8) and such aperture allows for the release of accumulated gasses within the pipeline system when said valve is in operation and under pressure and a valve poppet seat (9) is not closing the aperture (22). Thus the valve poppet (8) serves two functions; it acts as a seal to open and close the valve gas outlet (26), and also provides an aperture (22) through which accumulated gasses may escape when the valve outlet is closed.

A seat frame (5) is connected to the bottom of a valve cover (1) by frame bolts (7). Said seat frame (5) contains an opening for guiding the stem of said valve poppet (8) as it moves vertically to an open or closed position.

Via a double arm mechanism, a float (19) serves as a weight to allow said valve poppet (8) to move away form the air and vacuum seat (6) and provides buoyancy to push said valve poppet up toward the air and vacuum seat. When a pipeline system is initially filled, the poppet (8) is raised to a closed position through the buoyant force of the liquid on the float (19). During operation the float mechanism may drop due to a decrease in the liquid level. However, the poppet (8) will remain in a closed position due to sufficient air pressure within the valve. Said poppet (8) will only fall to open said gas outlet (26) if a vacuum occurs or the pipeline system is drained. The float (19) is attached to said mechanism by a vertically oriented rod (18).

Said double arm mechanism comprises a needle pivot arm (10), a tie arm (12), and a float pivot arm (13), to which said float rod (18) is attached. The top end of said tie arm (12) is connected pivotally to one end of said needle pivot arm (10) with the bottom end of said tie arm being connected pivotally to the midpoint of said float pivot arm (13).

The seat frame (5) comprises two parallel immobile arms which extend downward, one arm being longer than the other. The shorter said seat frame arm (23) is connected to the end of said needle pivot arm (10) forming a fulcrum axis. The longer said seat frame arm (24) being connected to the end of said float pivot arm (13) and forming a second fulcrum axis. Thus, the double arm mechanism contains two fulcrum pivot axes through which the force of the float (19) acts to open and close the valve. All pivot points within said mechanism are connected through the use of a pivot pin (14) and pivot washer (21).

The top of said float rod (18) is attached pivotally to one end of the float pivot arm (13) via a rod end (17) and rod bolt (16), thereby connecting the entire mechanism to said valve float (19).

The valve poppet seat (9) is attached to the top of said needle pivot arm (10) by a needle nut and washer (15). Said poppet seat (9) serves to push upward against the stem of said valve poppet (8) moving it to close said gas outlet (26), and also acts to close said gas outlet aperture (22) within the poppet stem through the buoyant effect of said valve float (19).

Thus, in the operation of FIG. 1, the double arm mechanism, float (19) and rod (18) serve as a force of gravity to pull the valve poppet (8) open when the liquid level within the valve is low, no buoyant force is present and there is insufficient gas pressure being applied to the valve poppet (8) to maintain it in a closed position, allowing a large amount of gas to pass through the open valve outlet (26) and thereby cause the liquid level to rise when present. This normally occurs during the startup of the valve when the pipeline system is initially filled. The rising liquid level will create a buoyant force on the float (19) to push the valve poppet (8) up and close the valve outlet (26) allowing gas to accumulate within the valve resulting in a lower liquid level. Sufficient gas pressure within the valve during operation will maintain this closed position, and a low liquid level will cause the float (19) to drop. Therefore, the poppet seat (9) will be pulled away from the poppet stem allowing accumulated gas to pass out through said aperture (22) within the valve poppet (8); thereby once again causing the liquid level to rise and create a buoyant force on the float (19) which pushes the poppet seat (9) up through the double arm mechanism and closes the gas aperture (22) within the valve poppet (8). This cycle will repeat as necessary to regulate the fluid flow within the pipeline system.

Figure 2:
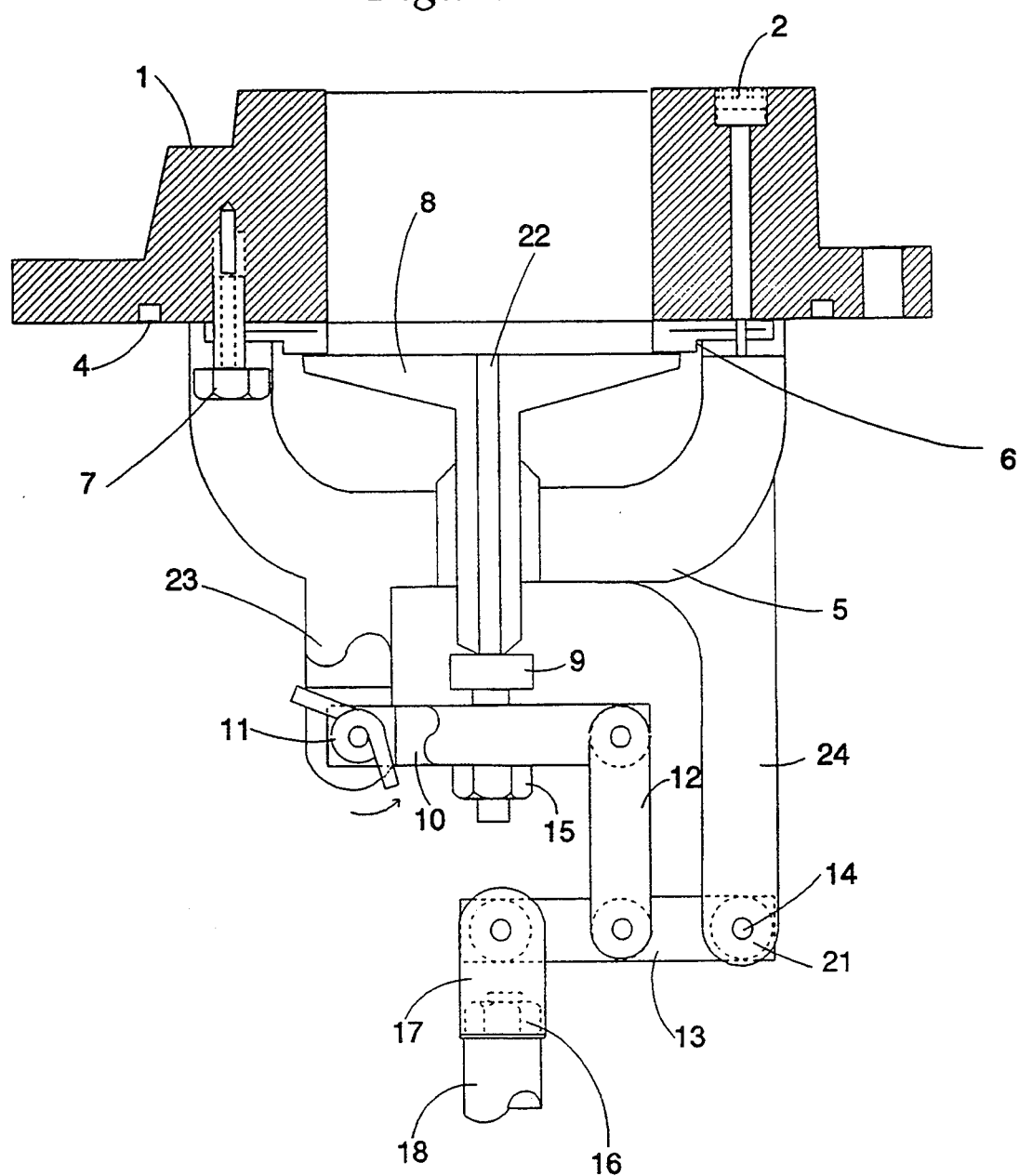
FIG. 2 is a detailed view of an enlarged section relative to FIG. 1, presenting the double arm mechanism with a cross sectional view of the torsion spring.

As indicated in FIG. 2, the fulcrum axis formed by the needle pivot arm (10) and said seat frame arm (23) contains a torsion spring (11) which assists the buoyant effect of said float (19) in rotating the needle pivot arm (10) and said poppet seat (9) upward against the stem of said poppet (8), thereby providing an additional force which would be equivalent to that created by a larger float. The same result may be achieved by placing the torsion spring (11) at the other fulcrum axis formed by the float pivot arm (13) and said seat frame arm (24). In this case, the buoyancy of the float would be aided by providing an additional upward force on the float pivot arm (13). Alternatively, the teachings of the present invention would allow the placement of a torsion spring at both fulcrum axes. This may be necessary when a spring is too large to be placed at one fulcrum axis. Instead, the equivalent of two smaller springs may be placed at both fulcrum axes.

Thus, the present invention provides a method of controlling liquid and gas flow in a pipeline system where the liquid level in a valve determines whether said valve is open or closed comprising the following steps. Orienting the flow control element of the valve for operation by a force applied thereto having a large vertical component; connecting said flow control element to be operated by a float (19) in the liquid, the level of which controls the opening and closing of said valve via a double arm mechanism containing two fulcrum pivot points; connecting the float (19) and said double arm mechanism by a float rod (18) through which force of buoyancy on float (19) closes said valve and the weight of said float opens the valve; pulling a poppet (8) down to open said valve via said double arm mechanism through weight of float (19); exhausting large volumes of air through gas outlet (26) of installed said valve when pipeline system is unfilled and/or not under pressure; pushing said poppet (8) and its stem up to close gas outlet (26) of said valve via a poppet seat (9) attached to said double arm mechanism when the valve is in operation and under pressure; releasing accumulated air within the pipeline system through a gas outlet aperture (22) in center of poppet (8) and its stem when the valve is in operation and under pressure; assisting the buoyant force of the float (19) by adding a torsion spring (11) to said fulcrum pivot axis of the double arm mechanism, thereby adding a force vector which would be equivalent to that created by a larger float than the float (19) that is being used; therefore, the double arm mechanism, float (19) and rod (18) serve as a force of gravity to pull the valve poppet (8) open when the liquid level within the valve is low and no buoyant force is present and there is insufficient gas pressure being applied to the valve poppet (8) to maintain it in a closed position, allowing gas to pass through the open valve outlet (26) thereby causing the liquid level to rise when present; the rising liquid level will create a buoyant force on the float (19) to push the valve poppet (8) up and close the valve outlet (26) allowing gas to accumulate within the valve resulting in a lower liquid level; sufficient gas pressure within the valve will maintain this closed position, and a low liquid level will cause the float (19) to drop, pulling the poppet seat (9) away from the poppet stem allowing accumulated gas to pass through said aperture (22) within the valve poppet (8); thereby once again causing the liquid level to rise and create a buoyant force on the float (19) which pushes the poppet seat (9) up through the double arm mechanism and closes the gas aperture (22) within the valve poppet (8), and thus repeating this cycle as necessary.

Figure 3:
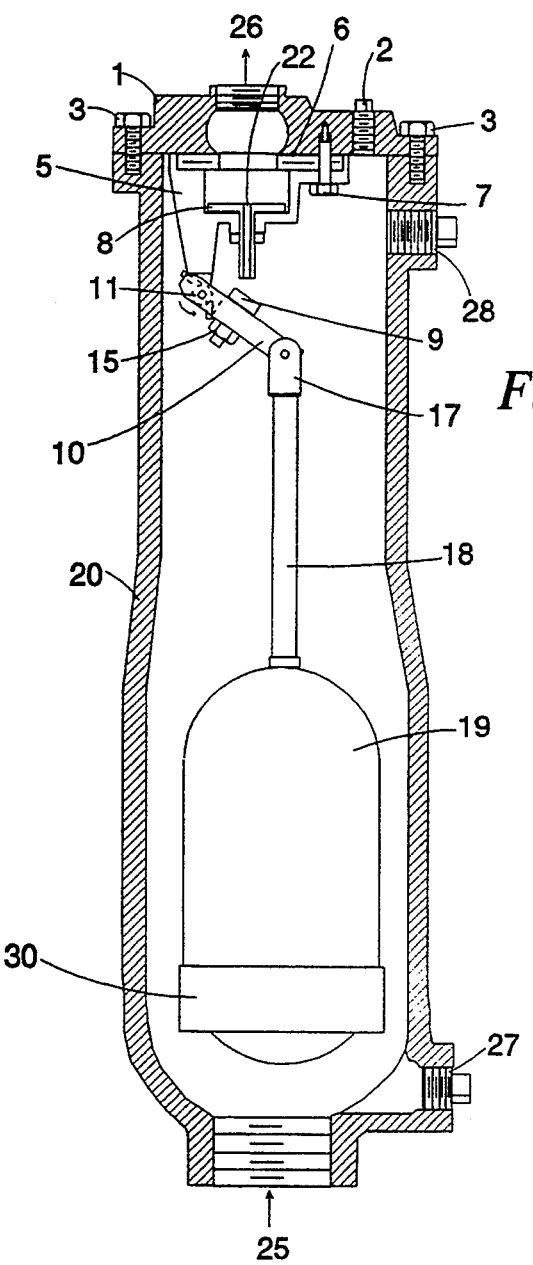
FIG. 3 is a vertical cross section of a sewage combination air and vacuum valve having a single arm lever mechanism with torsion spring.

FIG. 3 displays the application of the torsion spring to a single arm mechanism within a sewage combination air valve. Similar to the present invention, it has a long valve body (20) which ensures that liquid and solid wastes are kept from the working parts within the valve. The operation of the valve is comparable to the present invention (FIG. 1) with functionally corresponding parts being labeled accordingly. The valve is shown in an open condition with the poppet (8) away from an air and vacuum seat (6) opening the valve gas outlet (26). A poppet seat (9) is also pulled away from said poppet stem opening the gas outlet aperture (22) therein. A single arm mechanism is employed within this valve as opposed to the double arm mechanism utilized in the present invention. Therefore, a torsion spring (11) is placed at the only existing fulcrum axis formed by a float arm (10) and a seat frame (5). The valve float (19) also contains a skirt (30) which assists said float in quickly reacting to rapid water surges within the valve. This ensures that the valve will shut quickly preventing liquid and solid wastes from leaving when such surges occur. Although it is not indicated in FIG. 1, a float skirt may also be utilized in the present invention.

Figure 4:
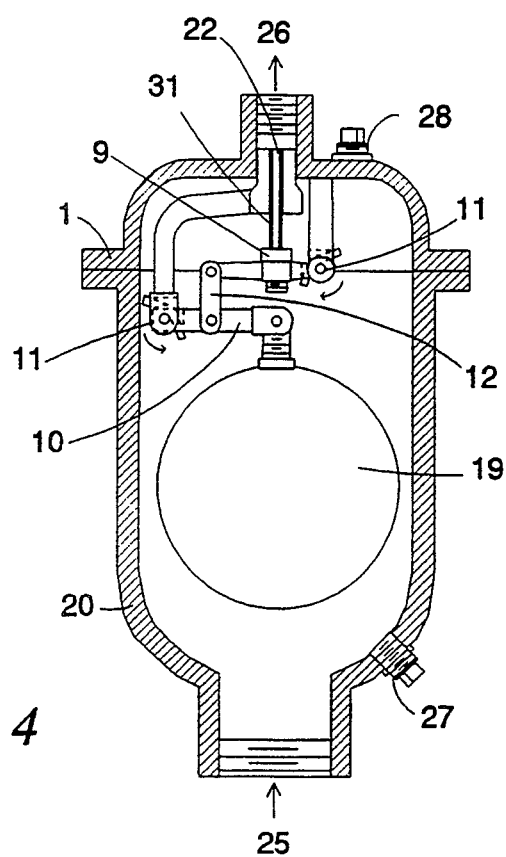
FIG. 4 is a vertical cross section of an air relief valve incorporating a double arm mechanism with torsion spring.

In FIG. 4 an air relief valve comprising a shorter body and float rod is shown. This valve functions to release small amounts of entrained air that may accumulate in a pipeline, chamber or tank. Once the accumulated air is exhausted, the valve shuts tightly through a float actuated mechanism to prevent water leakage. Unlike the combination valves in FIGS. 1 and 3, it does not serve the additional function of releasing large amounts of air when a pipeline system is being filled, drained or when a vacuum occurs. The valve in FIG. 4 includes a stationary needle (31) which contains a gas outlet aperture (22) located therein. Said aperture (22) is the only opening within the valve through which gas may pass and exit through the valve outlet (26). A needle seat (9) attached to a double arm mechanism is pushed up against said needle (31) to close said aperture (22) when there is a sufficient buoyant force on the float (19). When the liquid level within the valve is low, and the float (19) is no longer buoyant, the float (19) will drop and pull the needle seat (9) away from the needle (31) allowing gas to pass through said aperture (22) and out of the valve. As the gas is released, the liquid level in the valve will rise once again, lifting the float (19) and closing the valve. This cycle will repeat as often as necessary. As in the present invention, the valve contains a double arm mechanism with two fulcrum axes, thereby allowing a torsion spring (11) to be placed at either or both axes as shown, and assist the buoyant effect of the float. Therefore, the size of the float may be significantly reduced while still achieving the same buoyant effect to close the valve. Additionally, the overall size of the valve may be decreased, as the teachings of the present invention indicate.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

I claim:

1. A valve for controlling liquid flow in a pressurized system having a gas relief valve means where the liquid level in the valve determines whether said valve is open or closed comprising:
   (a) a valve body having at each extremity at least one opening; one opening at the bottom of said body being an input including pressurized liquid; one opening at upper part of said body being an outlet;
   (b) a valve poppet with a stem for opening and closing said outlet;
   (c) a float and rod connected operatively thereto in a vertical orientation for allowing said valve poppet to close and open said outlet;
   (d) a seat frame for guiding the stem of said valve poppet to allow an open and closed position based on buoyancy of float;
   (e) a fulcrum pivot lever mechanism to which said float rod is attached and which also contains a valve poppet seat for pushing valve poppet via its stem to close said valve outlet;
   (f) a fulcrum pivot axis of said fulcrum pivot lever mechanism containing a torsion spring which effects the buoyancy effect of said float, thereby providing an additional force which would be equivalent to that created by a larger float so that the size and force of said spring in turn minimizes the size of the float, the valve and its overall design.

2. A combination gas and vacuum valve for a pressurized liquid and gas system comprising:
   (a) a valve body having at each extremity at least one opening; one opening at bottom of said body being an input including pressurized liquid and gas and being continuously open when in use; the other opening at upper part of said body being an outlet for gas when system is not under pressure as measured in the valve;
   (b) a valve poppet for opening and closing said gas outlet; said poppet containing a gas outlet aperture within its stem for the release of accumulated gasses when said valve is in operation and under pressure;
   (c) a float and rod connected operatively thereto in a vertical orientation for allowing said valve poppet to close and open said gas outlet;
   (d) a seat frame for guiding the stem of said valve poppet to allow an open and closed position based on buoyancy of float;
   (e) a double arm mechanism comprising a needle pivot arm, tie arm, and float pivot arm to which said float rod is attached; said double arm mechanism containing two fulcrum axes through which a force of buoyancy moves said poppet to closed position;
   (f) a valve poppet seat attached to said needle pivot arm moving said valve poppet to closed position through its stem, and closing said gas outlet aperture within said poppet stem through buoyant force of said float in the pressurized liquid;
   (g) said fulcrum axis of said needle pivot arm containing a torsion spring which assists the buoyancy effect of said float; said torsion spring with tension rotating said needle pivot arm and said poppet seat upward against stem of said poppet, thereby providing an additional force which would be equivalent to that created by a larger float so that the size and the force of said spring in turn minimizes the size of the float, the valve and its overall design.

3. A combination gas and vacuum valve for a pressurized liquid and gas system as in claim 2 further comprising:
   (a) said valve poppet rising perpendicularly to air and vacuum seat to close said gas outlet when valve is in operation and under pressure, and moving vertically downward away from said air and vacuum seat to open said gas outlet for the release of large volumes of gas through the installed valve such as when the pipeline system is unfilled and/or not under gas pressure;
   (b) said valve float serving as a weight to allow said valve poppet to drop to open position and providing buoyancy to push said valve poppet up to closed position;
   (c) said seat frame connected to bottom of valve cover and containing an opening for guiding the stem of said valve poppet as it moves vertically to open and closed position based on buoyancy of float;
   (d) said double arm mechanism comprising a needle pivot arm, tie arm, and float pivot arm to which said float rod is attached; top end of said tie arm connected pivotally to end of said needle pivot arm; bottom end of said tie arm being connected pivotally to midpoint of said float pivot arm; said double arm mechanism containing two fulcrum axes through which a force of buoyancy moves said poppet to closed position;

(e) said seat frame having two parallel immobile arms which extend vertically downward, one arm being longer than the other; shorter said seat frame arm being connected to end of said needle pivot arm and forming said fulcrum axis; longer said seat frame arm being connected to end of said float pivot arm and forming second said fulcrum axis;

(f) the poppet seat attached to top of said needle pivot arm and pushing said valve poppet to closed position through said poppet stem, said poppet seat also closing said gas outlet aperture within said poppet stem through buoyant force of the float;

(g) the fulcrum axis of said needle pivot arm containing a torsion spring which assists the buoyancy effect of said float; said spring with tension rotating said needle pivot arm and said poppet seat upward against stem of said poppet, thereby providing an additional force which would be equivalent to that created by a larger float than the one being used.

4. A method of controlling liquid flow in a pressurized system having a gas relief valve means where the liquid level in a valve determines whether said valve is open or closed comprising the following steps;

(a) orienting the flow control element of a valve for operation by a force applied thereto having a large vertical component;

(b) connecting said flow control element to be operated by a float in the liquid, the level of which controls the opening and closing of said valve via a fulcrum pivot lever mechanism to which a float rod is attached;

(c) assisting the buoyancy force of the float by adding a torsion spring to the fulcrum pivot axis of said lever mechanism, thereby adding a force vector which would be equivalent to that created by a larger float than the float that is being used so that the size and the force of said spring in turn minimizes the size of the float, the valve and its overall design.

5. A method of controlling liquid and gas flow in a system where the liquid level in a valve determines whether said valve is open or closed as set forth in claim 4 comprising the following additional steps;

(a) connecting the float and said fulcrum pivot mechanism by a float rod through which force of buoyancy on float closes said valve;

(b) pushing a poppet up to close said valve via said lever mechanism which is driven by buoyant force of float;

(c) pulling said poppet down to open said valve via lever mechanism through weight of float.

6. A combination gas and vacuum valve for a pressurized liquid and gas system where the liquid level in the valve determines whether the valve is open or closed and when the valve is open gas is released from the combination pressurized liquid and gas system wherein the valve includes:

(a) a valve body having at each extremity at least one opening; one opening at the bottom of said body being an input including liquid; one opening at upper part of said body being an outlet;

(b) a valve poppet with a stem for opening and closing said outlet;

(c) a float and rod connected operatively thereto in a vertical orientation for allowing said valve poppet to close and open said outlet;

(d) a seat frame for guiding the stem of said valve poppet to allow an open and closed position based on buoyancy of the float from the pressurized liquid of the system;

(e) a fulcrum pivot lever mechanism to which said float rod is attached and which also contains a valve poppet seat for pushing valve poppet via its stem to close said valve outlet having at least one fulcrum pivot axis, wherein said combination is further characterized by adding a means for minimizing the size and volume of said float comprising a torsion spring means functioning about at least one of the fulcrum pivot axis of the said fulcrum pivot lever mechanism, the torsion spring functioning to provide a force in a direction such as to increase the buoyancy effect of said float which would be equivalent to that created by a larger float so that the size and the force of said spring in turn minimizes the size of the float, the valve and its overall design.

7. A combination gas and vacuum valve for a pressurized liquid and gas system where the liquid level in the valve determines whether the valve is open or closed and when the valve is open gas is released from the combination pressurized liquid and gas system wherein the valve includes:

(a) a valve body having at each extremity at least one opening; one opening at bottom of said body being an input including liquid and gas and being continuously open when in use; the other opening at upper part of said body being an outlet for gas when system is not under pressure as measured in the valve;

(b) a valve poppet for opening and closing said gas outlet; said poppet containing a gas outlet aperture within its stem for the release of accumulated gasses when said valve is in operation and under pressure;

(c) a float and rod connected operatively thereto in a vertical orientation for allowing said valve poppet to close and open said gas outlet;

(d) a seat frame for guiding the stem of said valve poppet to allow an open and closed position based on buoyancy of float from the pressurized liquid of the system;

(e) a double arm lever mechanism comprising a needle pivot arm, tie arm, and float pivot arm to which said float rod is attached; said double arm mechanism containing two fulcrum pivot axes through which a force of buoyancy moves said poppet to closed position;

(f) a valve poppet seat attached to said needle pivot arm moving said valve poppet to closed position through its stem, and closing said gas outlet aperture within said poppet stem through buoyant force of said float;

wherein said combination is further characterized by adding a means for minimizing the size and volume of said float comprising a torsion spring means functioning about at least one of the fulcrum pivot axes of the said fulcrum pivot lever mechanism, the torsion spring functioning to provide a force in a direction such as to increase the buoyancy effect of said float force which would be equivalent to that created by a larger float so that the size and the force of said spring in turn minimizes the size of the float, the valve and its overall design.

8. A combination gas and vacuum valve for a pressurized liquid and gas system where the liquid level in the valve determines whether the valve is open or closed and when the valve is open gas is released from the combination pressurized liquid and gas system wherein the valve includes:
(a) said valve poppet rising perpendicularly to air and vacuum seat to close said gas outlet when valve is in operation and under pressure, and moving vertically downward away from said air and vacuum seat to open said gas outlet for the release of large volumes of gas through the installed valve such as when the pipeline system is unfilled and/or not under gas pressure;
(b) said valve float serving as a weight to allow said valve poppet to drop to open position and providing buoyancy to push said valve poppet up to closed position;
(c) said seat frame connected to bottom of valve cover and containing an opening for guiding the stem of said valve poppet as it moves vertically to open and closed position based on buoyancy of float;
(d) said double arm mechanism comprising a needle pivot arm, tie arm, and float pivot arm to which said float rod is attached; top end of said tie arm connected pivotally to end of said needle pivot arm; bottom end of said tie arm being connected pivotally to midpoint of said float pivot arm; said double arm mechanism containing two fulcrum axes through which a force of buoyancy moves said poppet to closed position;
(e) said seat frame having two parallel immobile arms which extend vertically downward, one arm being longer than the other; shorter said seat frame arm being connected to end of said needle pivot arm and forming said fulcrum axis; longer said seat frame arm being connected to end of said float pivot arm and forming second said fulcrum axis;
(f) the poppet seat attached to top of said needle pivot arm and pushing said valve poppet to closed position through said poppet stem, said poppet seat also closing said gas outlet aperture within said poppet stem through buoyant force of the float, wherein said combination is further characterized by adding a means for minimizing the size and volume of said float comprising a torsion spring means functioning about at least one of the fulcrum pivot axis of the said fulcrum pivot lever mechanism, the torsion spring functioning to provide a force in a direction such as to increase the buoyancy effect of said float force which would be equivalent to that created by a larger float so that the size and the force of said spring in turn minimizes the size of the float, the valve and its overall design.

* * * * *